(No Model.) 2 Sheets—Sheet 1.
C. H. ANSPACH & J. J. WILHELM.
BAND CUTTING FEEDER FOR THRASHING MACHINES.
No. 412,715. Patented Oct. 15, 1889.
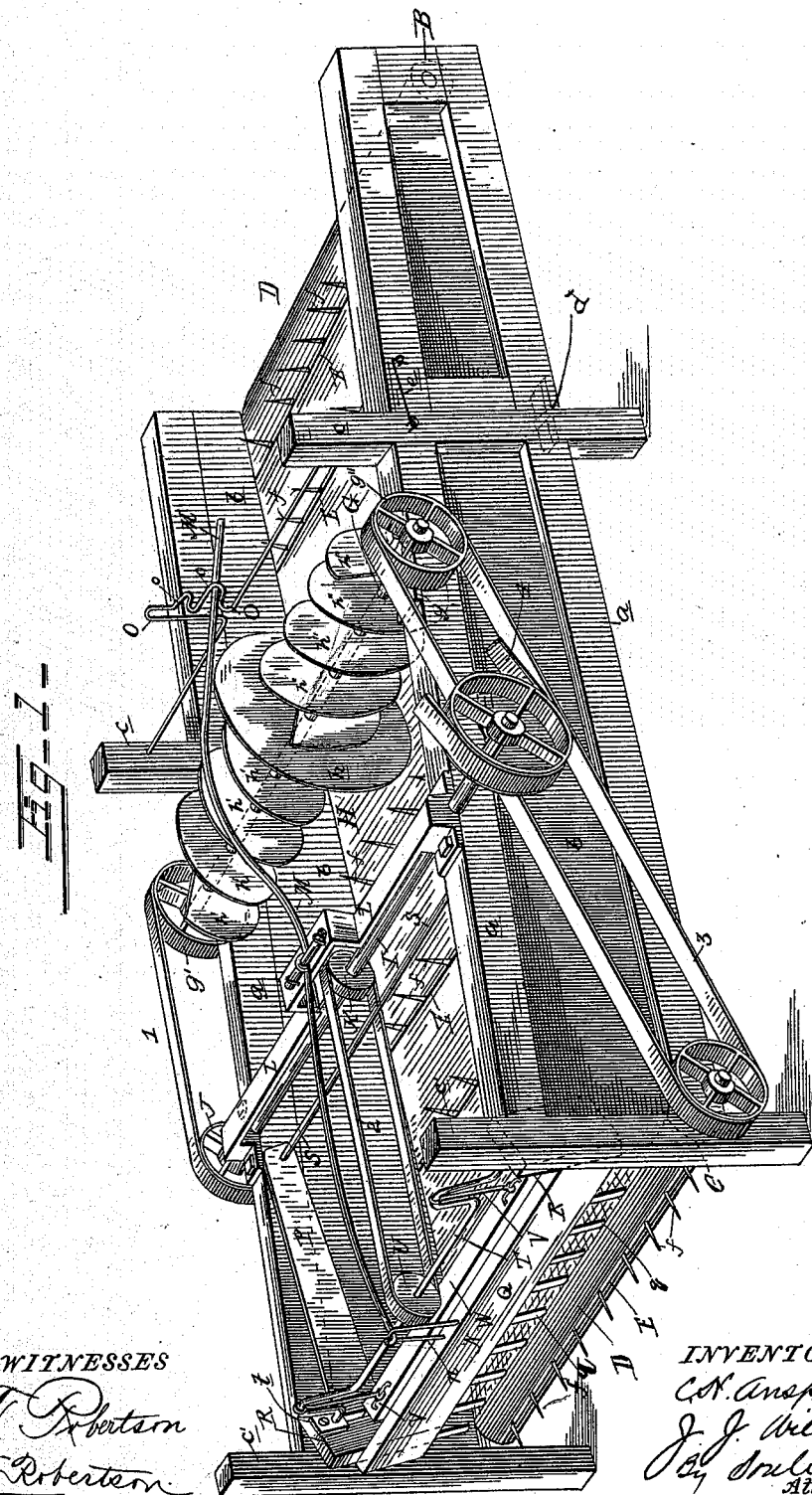
WITNESSES
INVENTORS (No Model.) 2 Sheets—Sheet 2.
C. H. ANSPACH & J. J. WILHELM.
BAND CUTTING FEEDER FOR THRASHING MACHINES.
No. 412,715. Patented Oct. 15, 1889.
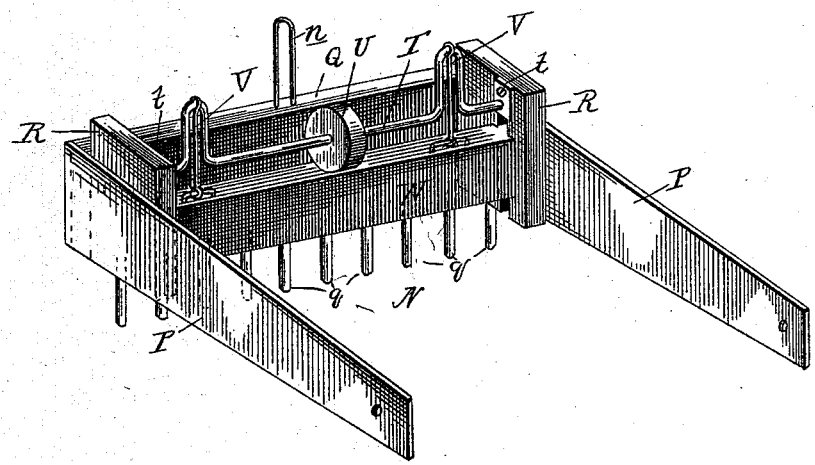
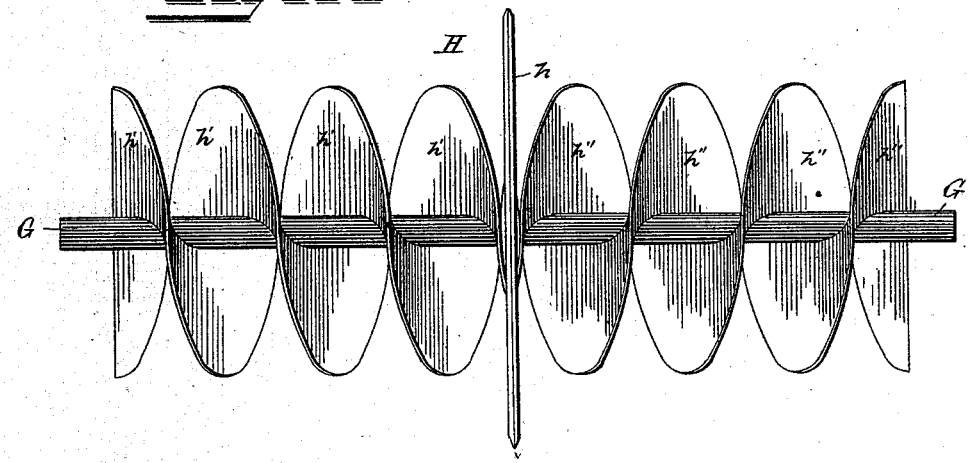
WITNESSES
Wm. T. Robertson
Thos. E. Robertson
INVENTORS
C H Anspach
J J Wilhelm
By Soulé & Co.
Attorneys.

United States Patent Office.

CHARLES H. ANSPACH AND JOHN J. WILHELM, OF CEDAR GROVE, INDIANA.

BAND-CUTTING FEEDER FOR THRASHING-MACHINES.

SPECIFICATION forming part of Letters Patent No. 412,715, dated October 15, 1889.

Application filed December 28, 1888. Serial No. 294,842. (No model.)

*To all whom it may concern:*

Be it known that we, CHARLES H. ANSPACH and JOHN J. WILHELM, citizens of the United States, residing at Cedar Grove, in the county of Franklin and State of Indiana, have invented certain new and useful Improvements in Band-Cutting Feeder for Thrashing-Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to a feeder for thrashing-machines and a device for cutting the bands or cords of the sheaves and spreading the grain as the sheaves pass upon the feeder.

The object of our invention is to provide a reliable automatic feeder having a combined band-cutter and spreader, a device for forcing the grain from the feeder, and a device for controlling the amount of grain to be fed to the machine.

The invention consists in the several features of construction and combinations of parts hereinafter fully described, and pointed out in the claims.

In the drawings, Figure 1 is a perspective view of our improved feeder. Figs. 2 and 3 illustrate parts in detail.

A represents the frame of the feeder, consisting of the bottom $a$, sides $b$, and parts $c\ c'$. If desired, the frame may be divided and hinged, as seen at $d$, to facilitate transportation, and provided with hook-and-staple connections $e$. At the front and rear of the frame A are arranged (in suitable bearings in the sides of the frame) rollers B and C, around which passes an endless feeding-carrier D. This endless carrier is provided with a number of metallic rods E, secured transversely upon the carrier about twelve inches apart, and provided with projecting pins or fingers F, adapted to engage the grain and carry it forward to the thrasher.

G represents a shaft secured in bearings $g\ g$ of the frame and carrying at its ends band-pulleys $g'\ g''$. The shaft G also carries a combined cutter and spreader H, consisting of a central cutter $h$ and oppositely-twisted spirals $h'\ h''$. Parallel to the shaft G is arranged a second shaft I, supported in bearings of the frame, as shown, and provided with end pulley J and an intermediate pulley K. A cross-bar L is secured above the shaft I, and upon said cross-bar is fulcrumed a lever M, the rear end of which is connected to a movable frame N by means of a link or staple $n$. The front end of the lever M is adapted to be engaged with one of the steps $o$ of a catch device O, arranged between the front posts $c$ of the frame.

At the rear end of the frame and between the posts $c\ c'$ is a device for controlling the feed, consisting of sides P P and cross-piece or gate Q, provided with fingers $q$, and uprights R R. The front ends of the sides P P are pivotally secured upon a cross-rod S, supported in bearings in the sides of the frame A.

T represents a crank-shaft supported in bearings $t\ t$ in the upper ends of the uprights R R and carrying a band-pulley U. This crank-shaft T is connected by depending rods V to a cross-piece W, which latter serves to force the grain out of the feeder, as will be explained.

An endless band 1 connects the shafts G and I at one side of the feeder. A band 2 connects the shaft I and crank-shaft T. A band 3 connects the rear roller C and shaft G.

The shaft I is connected by a band 4 to any source of power.

The operation of the machine is as follows: The sheaves are laid upon the endless carrier at the front end of the machine, and are carried by the transversely-arranged teeth under the revolving cutter H, which cuts the band and spreads the grain as it passes. The forcing-bar or "crowder" W operates to force the grain under the gate Q, which latter is controlled by the lever M.

We claim—

An endless traveling carrier having projecting pins or fingers and a rotating shaft having a central band-cutter and oppositely-twisted spreading spirals on each side of said cutter, in combination with a verticallymovable feed-controlling frame located behind said rotary shaft, downwardly-projecting fingers q on said frame, a lever for raising and lowering said frame, a vertically-sliding bar W, sliding in said frame in front of said fingers q, and a rotating crank-shaft journaled in said frame and operating said bar W, substantially as set forth.

In testimony whereof we affix our signatures in presence of two witnesses.

CHARLES H. ANSPACH.
   JOHN J. WILHELM.

Witnesses:
 LEWIS HORNUNG,
 CHAS. SAMONIEL.